(12) United States Patent
Dionne et al.

(10) Patent No.: US 7,096,453 B2
(45) Date of Patent: Aug. 22, 2006

(54) DATA DEFINITION LANGUAGE

(75) Inventors: Carl Dionne, Montreal (CA); Martin Lavoie, Longueuil (CA)

(73) Assignee: Proksim Software Inc., Montreal (CA)

( * ) Notice: Subject to any disclaimer, the term of this patent is extended or adjusted under 35 U.S.C. 154(b) by 636 days.

(21) Appl. No.: 09/809,309

(22) Filed: Mar. 16, 2001

(65) Prior Publication Data

US 2002/0133478 A1 Sep. 19, 2002

(30) Foreign Application Priority Data

Mar. 15, 2001 (GB) ................. 0106408.8

(51) Int. Cl.
*G06F 9/44* (2006.01)
*G06F 9/45* (2006.01)

(52) U.S. Cl. ............... 717/105; 717/109; 717/113; 717/114; 717/140; 717/165

(58) Field of Classification Search ............. 717/731, 717/103, 105–165; 345/963–970; 709/201–216; 707/1–10
See application file for complete search history.

(56) References Cited

U.S. PATENT DOCUMENTS

| 5,206,951 | A | * | 4/1993 | Khoyi et al. ............... 719/315 |
| 5,524,253 | A | * | 6/1996 | Pham et al. ............... 709/202 |
| 5,606,493 | A | * | 2/1997 | Duscher et al. ............... 700/5 |
| 5,772,512 | A | | 6/1998 | Chichester |
| 5,838,909 | A | | 11/1998 | Roy et al. |
| 5,879,236 | A | | 3/1999 | Lambright |
| 6,640,255 | B1 | * | 10/2003 | Snyder et al. ............... 719/315 |

OTHER PUBLICATIONS

Malcolm P. Atkinson, Types and Persistence in Database Programming Languages, (p) Jun. 1987 pp. 106-190.*
Craymer et al.; *A scalable, RTI-compatible interest manager for parallel processors*; Proceedings of the 1997 Spring Simulation Workshop; 1997, pp. 973-976.
Van Hook et al.; *Approaches to RTI implementation of HLA ditribution Management services*; Proceedings of the 15thWorkshop on Standards for interoperability of distributed simulations; 1996.
Petty, Mikel et al.; *Experimental comparision of d-rectangle intersection algorithms applied to HLA data distribution*; Proceedings of the 1997 Fall Simulation Interoperability Workshop, 1997.

(Continued)

*Primary Examiner*—Chameli C. Das
*Assistant Examiner*—Chuck Kenall
(74) *Attorney, Agent, or Firm*—James Creighton Wray

(57) ABSTRACT

The present invention provides an apparatus and method for describing (603) objects (1604) to be shared over a network (1502) by a plurality of network-connected terminals (1501, 1504, 1506) by means of ASCII instructions (201, 202, 206) and for the compiling (103, 104) thereof within an instructions set (208) executable by said network-connected terminals. Each of said network-connected terminals (1501, 1504, 1506) is equipped with visual display means, processing means, storage means and memory means, wherein said memory means is configured to store (1603) said executable instructions set (208) and said processing means is configured by said executable instruction set (208) to manage the duplication of said described objects (1604).

22 Claims, 17 Drawing Sheets

OTHER PUBLICATIONS

Singhal, Sandeep K.; *Effective remote modeling in large-scale distributed simulation and visualization environments*; PhD Thesis, Stanford University; Palo Alto, CA 1996.

Singhal et al.; *Using a position history-based protocol for distributed object visualization*;esigning real-time graphics,for entertainment (Course notes for SIGGRAPH '94 Course No. 14); Jul. 1994.

Singhal et al.; *Chapter 8, Internet Networked Virtual Environments*; ACM Press Books, SIGGRAPH Series; Jul. 1999; pp. 251-271.

Van Hook et al.; *Approaches to Relevance Filtering*; Proceedings of the Eleventh Workshop on Standards for the Interoperability of Distributed Simulations; Sep. 26-30, 1994; pp. 367-369.

* cited by examiner

Figure 1 [Prior Art]

```
802 ──── doclass GeoObject {                801
                position m_dsPos ──── 803
        }
804 ──── doclass Cube : GeoObject {
                                             805
                cubedata m_dsCubeData ────
        }
806 ──── dataset Position {
                double x ;  ⎤
                double y ;  ⎬ 807
                double z ;  ⎦
        }
808 ──── dataset CubeData {
                                        809
                ushort m_usTexture ────
        }
```

```
                                            811
812 ──── Title "Cube Animation";
813 ──── define GeoObject;
814 ──── define Cube;
```

*Figure 8*

```
# include <GeoObjectDDL.h>    902
# include <CubeDDL.h>         904
# include <PositionDDL.h>     906
# include <CubeDataDDL.h>     908

1001                      901
class GeoObject : public DOCLASS(GeoObject) {
    // user-implemented actions & methods
    i.e. Object has X-Y-Z attributes
}

1002              903
class Cube : public DOCLASS(Cube) {
    // user-implemented actions & methods
    i.e. User re-sizing of Cube
}

1003                905
class Position: public DATASET(Position) {
    // user-implemented actions & methods
    i.e. Reading of user input
}

1206                  907
class CubeData: public DATASET(CubeData) {
    // user-implemented actions & methods
    i.e. User-choice of texture
}
```

*Figure 12*

DATA DEFINITION LANGUAGE

BACKGROUND OF THE INVENTION

1. Field of the Invention

The present invention relates to a method of describing data to be shared by a plurality of network-connected terminals over a network, within a set of program instructions.

2. Description of the Related Art

Methods to describe data or objects within program instructions executable by terminals equipped with processing means are well known. The development of higher-level programming languages (HLPLs) such as C or C++, has lead to an increased efficiency of processor usage for any given application programmed with this type of language, and also resulted in productivity improvements in terms of application development indeed, an additional benefit of said HLPS, also known as object-oriented programming, is the ability for programmers to develop reusable software components, or portions of a set of programming instructions.

With electronic communication in leisure or business activities becoming increasingly important, most programs utilised within the scope of those activities are today required to share objects over networks, such as local area networks or the Internet. In this context, object-oriented programming traditionally resorts to message-based networking solutions, wherein programmers implement program instructions pertinent to the passing of packets of data between network sockets according to various internet protocols. The implementation of the object sharing portion of instructions within a set of program instructions is traditionally fairly expensive as much development time is spent writing said networking instructions in order for those to accurately manage the sharing of existing classes of objects, which are usually implemented at first within said program instructions set for local processing.

The implementation of networking instructions requires extensive further testing of the functionality of the overall program over networks prior to commercial release in addition to the initial testing of the program instructions for programming faults, which is traditionally executed locally. Said expenses are further compounded by the number of independent types of user terminal, or 'platforms', a program developer wishes to publish its program instructions for, as said platforms traditionally require specifically-adapted instantiations of the same instructions set and thus artificially increase the development time and resources required to generate the executable instructions set.

The present invention provides a higher-level programming language (HLPL) easily comprehensible by those skilled in the art, which describes objects to be shared by network-connected terminals at the onset of the writing of a set of program instructions, wherein network instructions are embedded within the object classes and thus do not require additional network-specific instructions to be implemented within the main program instructions set. This solution facilitates testing of the overall program over networks throughout the development of the project instead of said testing being carried out at the end. The platform independent characteristic of the HLPL according to the invention further reduces the financial overhead generated by a multiple-platform commercial release, as the objects to be shared need be described according to said HLPL only once.

BRIEF SUMMARY OF THE INVENTION

According to a first aspect of the present invention, there is provided an apparatus comprising visual display means, processing means, storage means and memory means, wherein said memory means is configured to store program instructions or describing objects to be shared over a network by a plurality of network-connected terminals by means of ASCII instructions and for the compiling thereof within an instructions set executable by said network-connected terminals. Each of said network-connected terminals is equipped with visual display means, processing means, storage means and memory means, wherein said memory means is configured to store said executable instructions set and said processing means is configured by said executable instructions to manage the duplication of said described objects.

According to a second aspect of the present invention, there is provided a method of describing objects to be shared by a plurality of network-connected terminals over a network within an instructions set executable by said network-connected terminals, wherein each of said network-connected terminals is equipped with visual display means, processing means, storage means and memory means, wherein said memory means is configured to store said executable instructions set and said processing means is configured by said executable instructions to manage the duplication of said described objects.

BRIEF DESCRIPTION OF THE SEVERAL VIEWS OF THE DRAWINGS

FIG. 8 illustrates the ASCII contents of a DDL file and the ASCII contents of a DDF file shown in FIGS. 2 and 6;

FIG. 12 Illustrates the ASCII contents of a user-implemented source file declaring local methods shown in FIGS. 1, 2 and 6;

DETAILED DESCRIPTION

The invention will now be described by way of example only with reference to the previously identified drawings.

Figure 1:
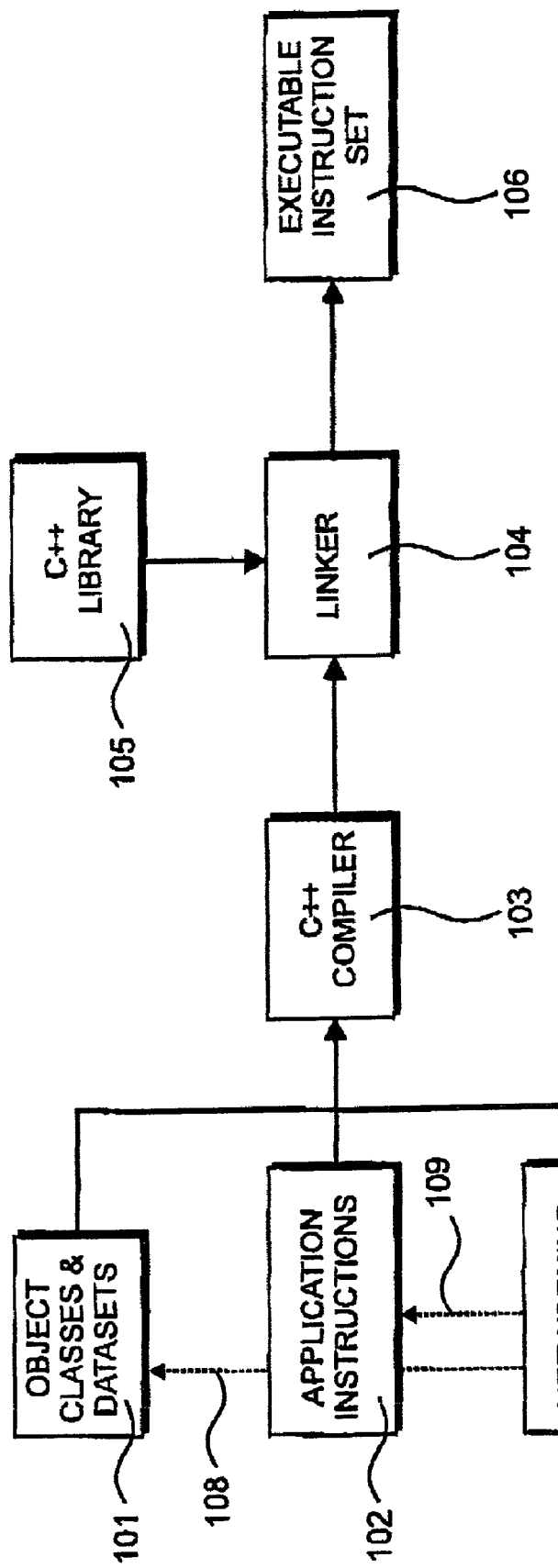
FIG. 1 illustrates a known approach to generating an instructions set executable by a user terminal equipped with processing means, including network-specific instructions for sharing objects.

Users share objects over networks according to instruction sets executed by their respective terminals. Said instruction sets are commonly referred to as programs and are traditionally generated by programmers as a solution to particular requirements expressed by said users in terms of terminal functionality. An approach to generating such an instruction set executable by a user terminal equipped with processing means, including network-specific instructions for sharing objects, according to the prior art is shown in FIG. 1.

It was previously explained that a preferred programming language used by those skilled in the art in order to write an instruction set is a higher level programming language, such as C++. Accordingly, much like any other programming language, C++ has declaration rules, structuring rules and specific terminology which must all be adhered to by a programmer developing a program. According to object-oriented programming, a program is first defined in terms of the objects to be used and their purpose, ie operations performed on an object or operations performed by an object. For instance, a 'File' object within a file management program includes functions, known as member functions, such as copying, deleting or renaming. Similarly, said 'File' object includes variables, known as member variables such as name, size and date.

Within this context, an object class provides a template which defines such member functions and member variables required by the class type, and an object is thus an instantiation, or a specific example of a class, i.e. essentially an object variable. The class must therefore be defined before an object is declared by the programmer, so that instantiations of a class can 'inherit' the member functions and variables of the class. In the above example, said 'File' object class would be defined by the programmer which includes all of the member functions and member variables detailed thereabove. Objects inheriting from said 'File' object class would be for instance a 'text file' object or a 'bitmap file' object.

FIG. 1

Object classes and datasets 101 are therefore traditionally implemented first when a program is being written. Said implementation consists of inputting strings of ASCII characters in accordance with the rules and syntax of the particular programming language used. The application instructions 102 are implemented next and contain the programming steps required for the program to execute operations on the previously implemented objects, or the programming steps required by said objects to perform said operations, i.e. the member functions. The ASCII files generated by the above operations are known as 'source' files.

Upon completing the implementation of object classes, objects and functions, the totality of the instructions code written in ASCII characters are compiled by a C++ compiler 103, the function of which is essentially to translate strings of ASCII-written instructions, known as declarations to those skilled in the art, into binary code understandable by a processor. Compiler 103 generates a binary file known as an object file, which is not directly executable as its contents are not complete: a C++ compiler includes functions which rapidly execute the most frequent operations and thus reduce the number of instructions to write within a program. Said functions are traditionally declared in 'header' files which are themselves stored in a library, such as library 105. Thus, once the compiler 103 has generated an object file, a linker 104 combines the instructions within the object file with the functions provided by the compiler itself such that an executable instruction set 106 is eventually obtained.

According to the prior art, in order to implement networking instructions 107, a programmer traditionally completes the entire chain of above operations until executable code 106 is obtained and, after extensive testing has been carried out, the program can be executed locally in a stable fashion. The amount of programming time and subsequent testing necessary to implement networking instructions 107 is then directly proportional to the extent of the required 'back-tracking' (108, 109) within the declarations of the object classes, objects and the application instructions. Even if the object classes and datasets 101 and application instructions 102 do not require a complete re-writing, the amount of additional declarations required for the executable code to perform its functions over a network in a stable fashion is traditionally fairly extensive, as multiple instantiations of the compiling and linking operations must be performed in order to produce a workable version of the program, to test said program as part of an optimisation process and to modify the networking-specific instructions further and further within said optimisation process.

Figure 2:
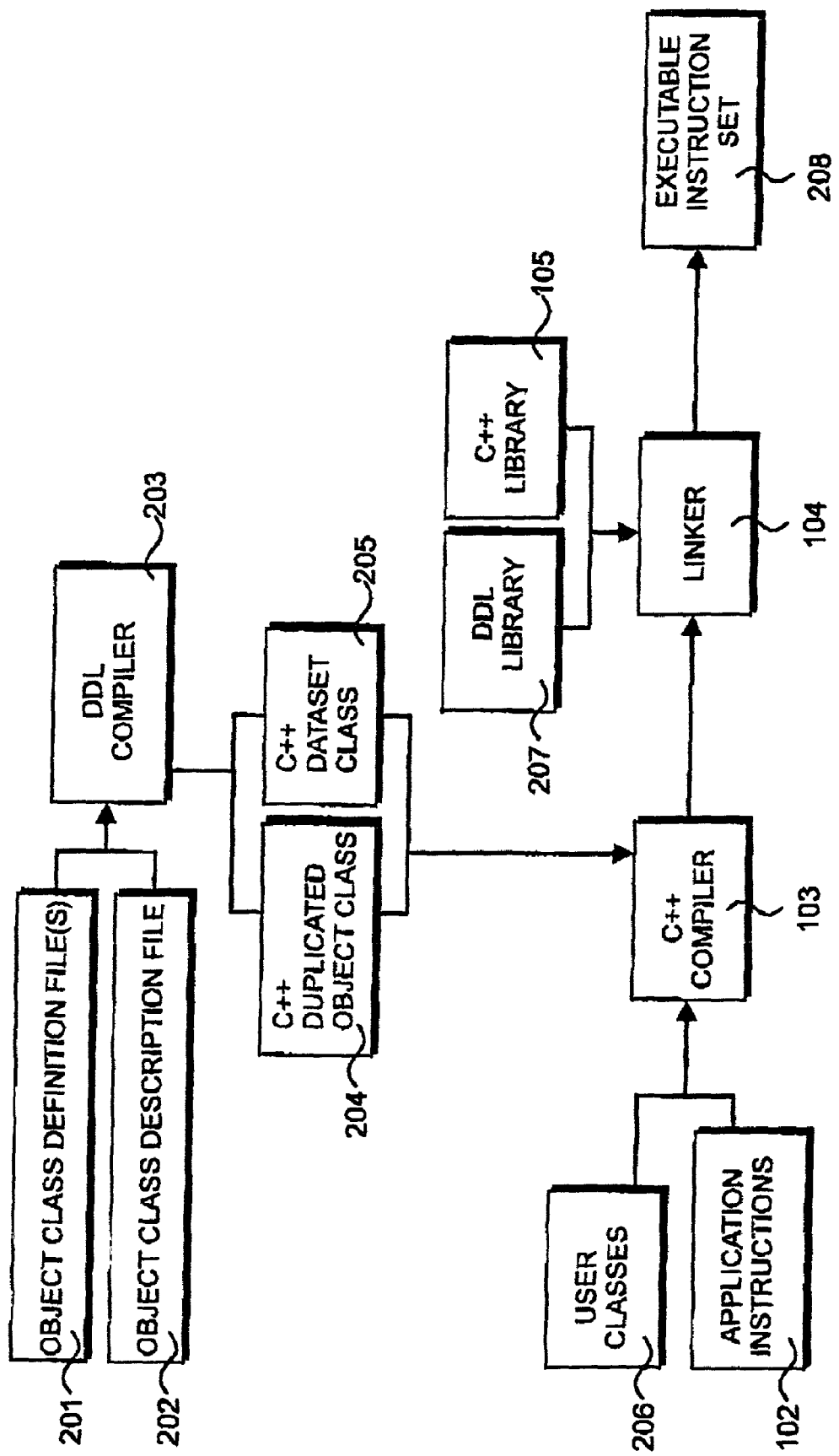
FIG. 2 shows an improved method for generating an instructions set executable by a user terminal equipped with processing means, including network-specific instructions for sharing objects, according to the invention.

An improved approach to generating an instruction set executable by a user terminal equipped with processing means, including network-specific instructions for sharing objects, according to the invention is shown in FIG. 2.

FIG. 2

Whereas networking instructions are implemented at the outset of the development of a program according to the prior art and consist of specific declarations pertaining to the management of the distribution of objects and their modifications by member functions over a network, wherein the original object classes, objects, member functions and member variables must be accordingly amended, the present invention provides a higher level programming language, known as the Data Definition Language, which embeds networking instructions within the object classes themselves at the onset of the development of a program.

In accordance with program development procedures known to those skilled in the art, object classes and datasets are implemented first when a program is being written according to the present invention. Said object classes and datasets are written and stored in one or a plurality of object class definition files 201, which are abbreviated as DDL files. Subsequently to the implementation of the DDL files 201, a corresponding object class description file 202 is implemented, which is abbreviated as DDF file. The Data Definition Language, like other object oriented programming languages, also has declaration rules and specific terminology.

Upon completing the writing of the DDL files 201 and the DDF file 202 whilst complying with the rules and syntax of the Data Definition Language according to the invention, both of said DDL files and DDF file are compiled by a DDL compiler 203. The function of said DDL compiler 203 is similar to the function of the C++ compiler 103, in that it generates C++ classes corresponding to the declarations contained within the DDL files, such that said C++ classes can then be underwood and compiled by C++ compiler 103 in order to generate the object file and then the executable instructions set. Said C++ classes generated by the DDL compiler 203 include duplicated object class DOCLASS 204 and dataset class DATASET 205.

In both instances, the DDL compiler 203 generates the appropriate source files and header files, such that the programmer can implement programmer-defined classes 206 which will inherit from the classes 204, 205. The function of said user implemented classes 206 is to implement any local variables or methods which are not distributed, as they constitute local information which is irrelevant to a remote terminal. Subsequently to the implementation of user defined classes 206, application instructions 102 are implemented in accordance with the methods declared in all of the source files previously generated. The C++ compiler 103 then compiles all the source files 204, 205, 206 and 102 into binary code and the linker 104 subsequently associates the generated object file with C++ library 105 and Data Definition Language library 207. The function of library 207 is identical to the function of library 105 but its contents, ie functions which rapidly execute the most frequent operations, include mostly functions dedicated to the duplication, i.e. distribution, of objects over networks Any iteration of the executable instructions set 208 generated by the linking operation performed by the linker 104 therefore includes networking instructions, such as networking instructions 107, as the classes 204, 205 generated by the DDL compiler 203 encapsulate all of the required network code. Thus, any application or program which requires the sharing of its object over networks and is implemented according to the invention can be easily prototyped, as its executable instruction set includes classes 204, 205 from the onset and testing of said executable instruction set over networks can thus also be carried out from the onset.

Figure 3:
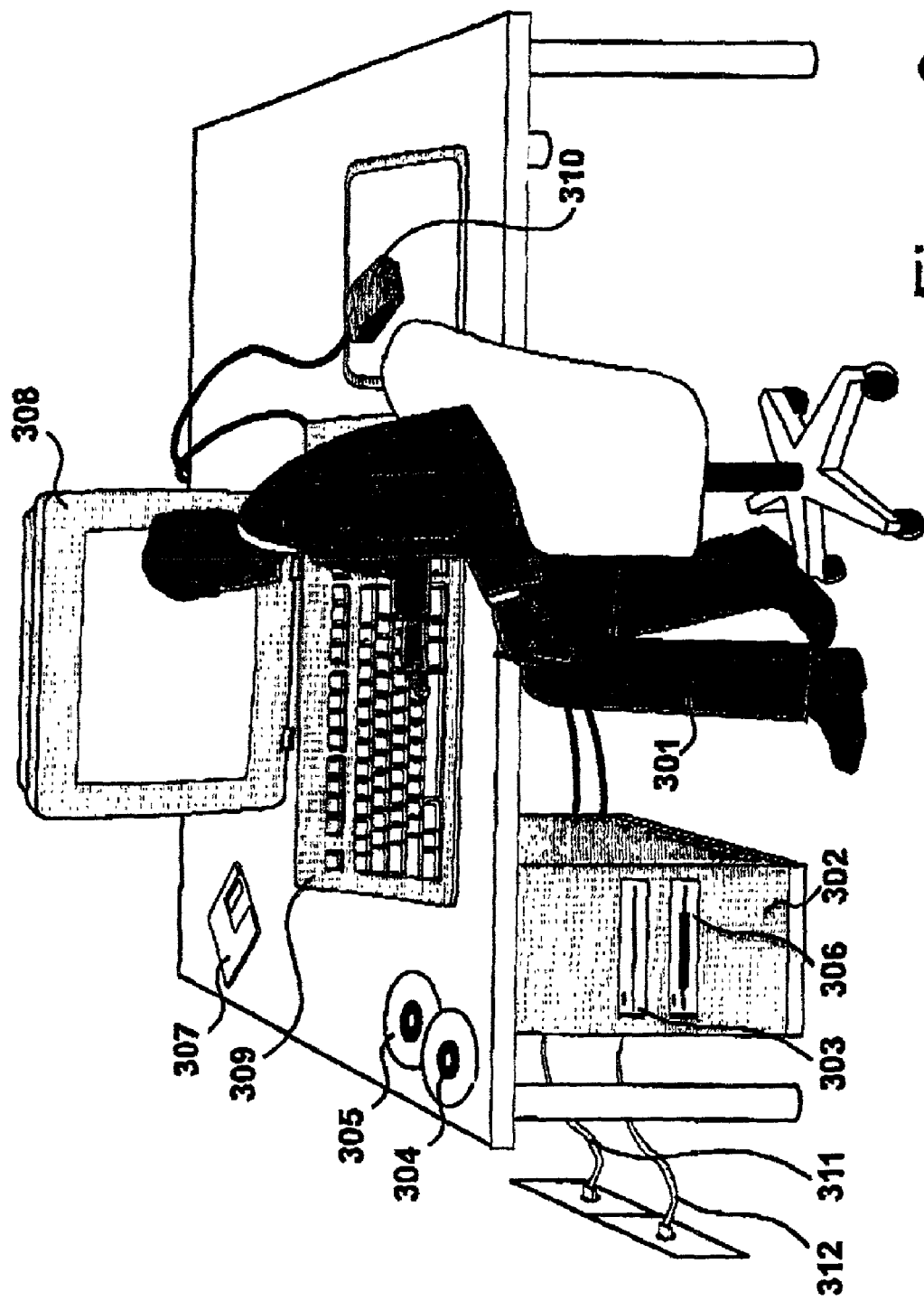
FIG. 3 shows a user terminal for generating an instructions set shown in FIG. 2.

A computer programming system for generating the instructions set 208 is shown in FIG. 3.

FIG. 3

A programmer 301, is shown who primarily uses a programmable computer 302, having a drive 303 for receiving CD-ROMS 304 and writing to CD-RAMS 305 and a drive 306, for receiving high capacity magnetic disks such as zip disks 307. According to the present invention, computer 302 may receive program instructions via an appropriate CD-ROM 304 or instructions sets may be written to a rewritable CD-RAM 305 and said program instructions may be received from or said instructions set may be written to a zip disk 307 by means of drive 306. Input ASCII characters or output instructions set, whether executed or not, are displayed on a visual display unit 308 and said manual input is received via a keyboard 309 and a mouse 310. Data may also be transmitted and received over a local area network 311, or the Internet by means of modem connection 312.

Figure 4:
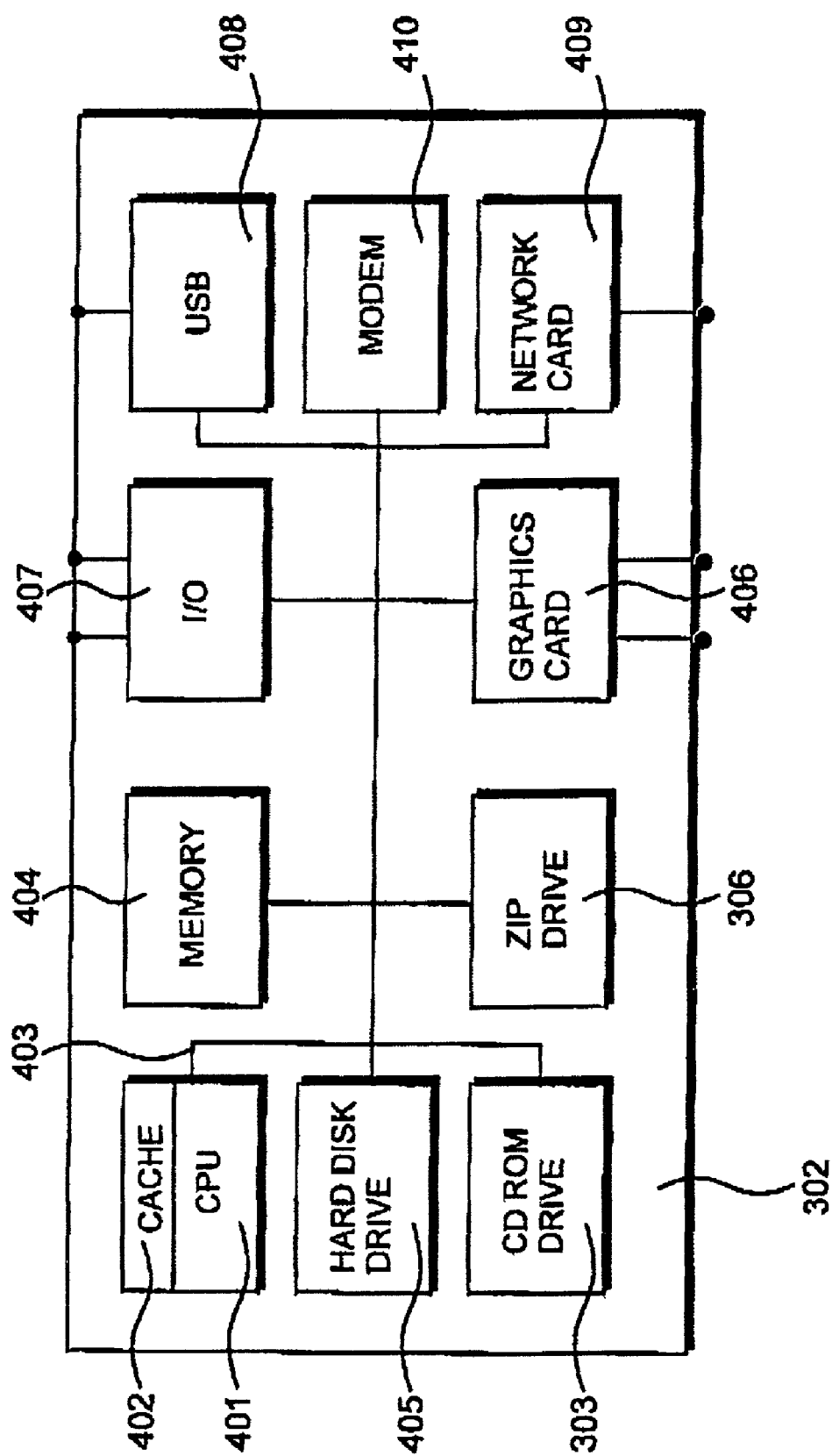
FIG. 4 details hardware components of the user terminal shown in FIG. 3, including a memory.

The components of computer programmer system 302 are detailed in FIG. 4.

FIG. 4

A central processing unit 401 fetches and executes instructions and manipulates data. Frequently accessed instructions and data are stored in a high-speed cache memory 402. Said central processing unit 401 is connected to a system bus 403. System bus 403 provides connectivity with a larger main memory 404, which requires significantly more time for the CPU to access than the cache 402. The main memory 404 contains between sixty-four and two hundred and fifty-six megabytes of dynamic random access memory. A hard disk dive (HID) 405 provides non-volatile bulk storage of instructions and data. A graphics card 406 receives graphics data from the CPU 401, along with graphics instructions and supplies graphical data to visual display unit 308. The I/O device 407 or universal serial bus 408 receive input commands from keyboard 309 and mouse 310. Zip drive 306 is primarily provided for the transfer of data, such as sets of ASCII characters corresponding to C++ declarations, and CD-ROM drive 303 is provided for the loading of new executable instructions to the hard disk drive 405 and the storing of compiled and linked executable instructions sets. A network card 409 provides connectivity to the local area network 311 and a modem 410 provides connectivity to the Internet via a telephone connection to the programmer's internet service provider. The equipment shown in FIG. 4 constitutes a personal computer of fairly standard type, such as an IBM compatible PC or Apple Macintosh.

Figure 5:
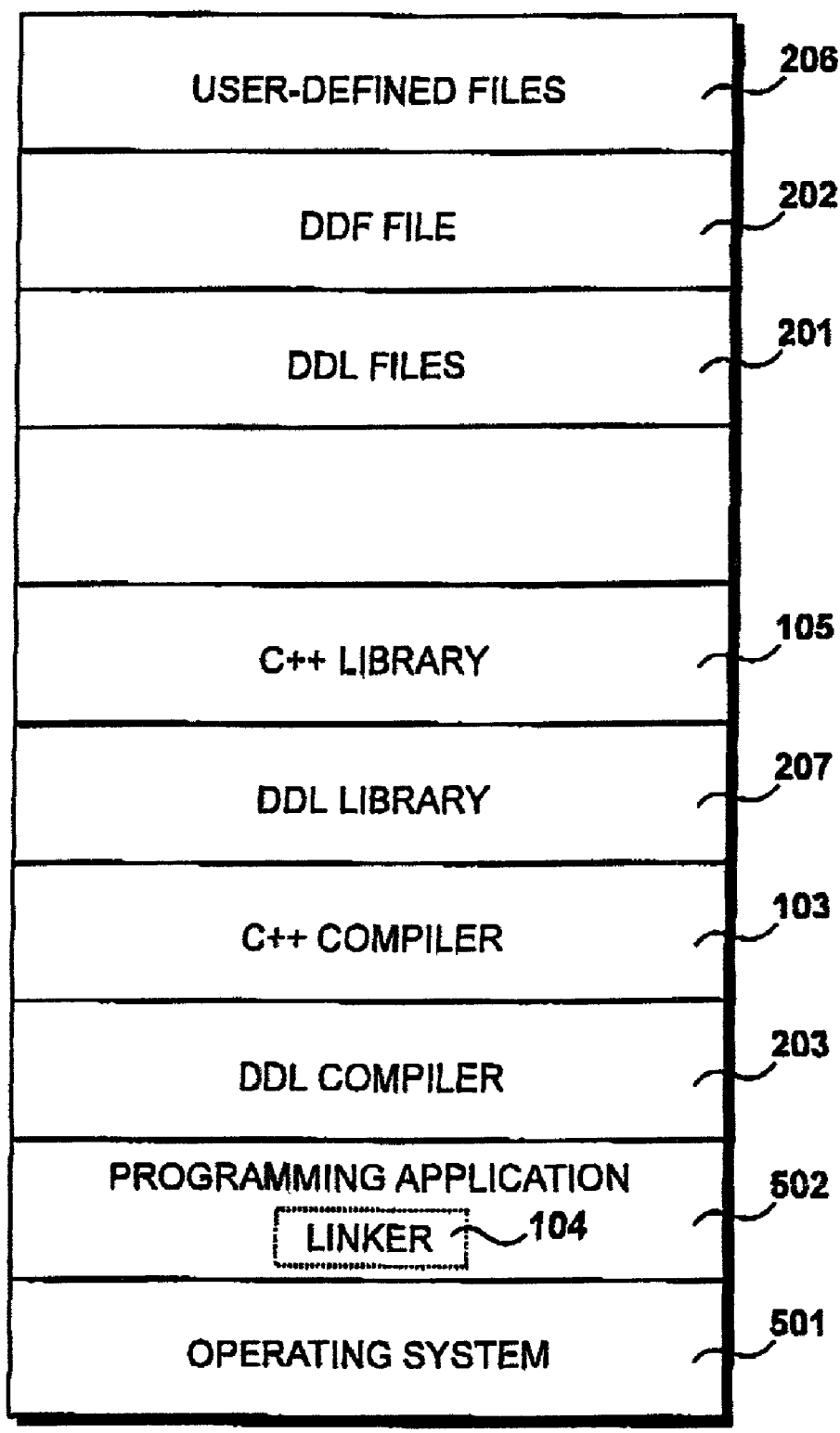
FIG. 5 details contents of the memory shown in FIG. 4, including files containing higher-level programming language libraries, a pre-compiler, a compiler and files shown in FIG. 2.

A summary of the contents of the main memory 404 of the computer programming system 302 is shown in FIG. 5, as subsequently to the loading of instructions required to generate an executable instructions set.

FIG. 5

Main memory 404 includes primarily an operating system 501, which is preferably Microsoft Windows 2000 or LINUX as said operating systems are considered by as those skilled in the art to be particularly stable when using computationally intensive applications. Main memory 404 also includes a programming application 502, which provides programmer 301 with means with which to visualise ASCII characters inputted by means of keyboard 309 and display said ASCII input onto visual display unit 308. Programming application 502 also includes a linker, such as linker 104, in order to associate the object files which will be generated and the libraries which will be detailed further below and identify and subsequently display linking errors. Main memory 404 includes a DDL compiler 203 according to the invention, a C++ compiler 103 and their respective instructions libraries, DDL library 207 and C++ library 105. Main memory 404 finally includes ASCII files such as DDF files 201 according to the invention, a DDF file 202 according to the invention and further user-defined files 206.

Figure 6:
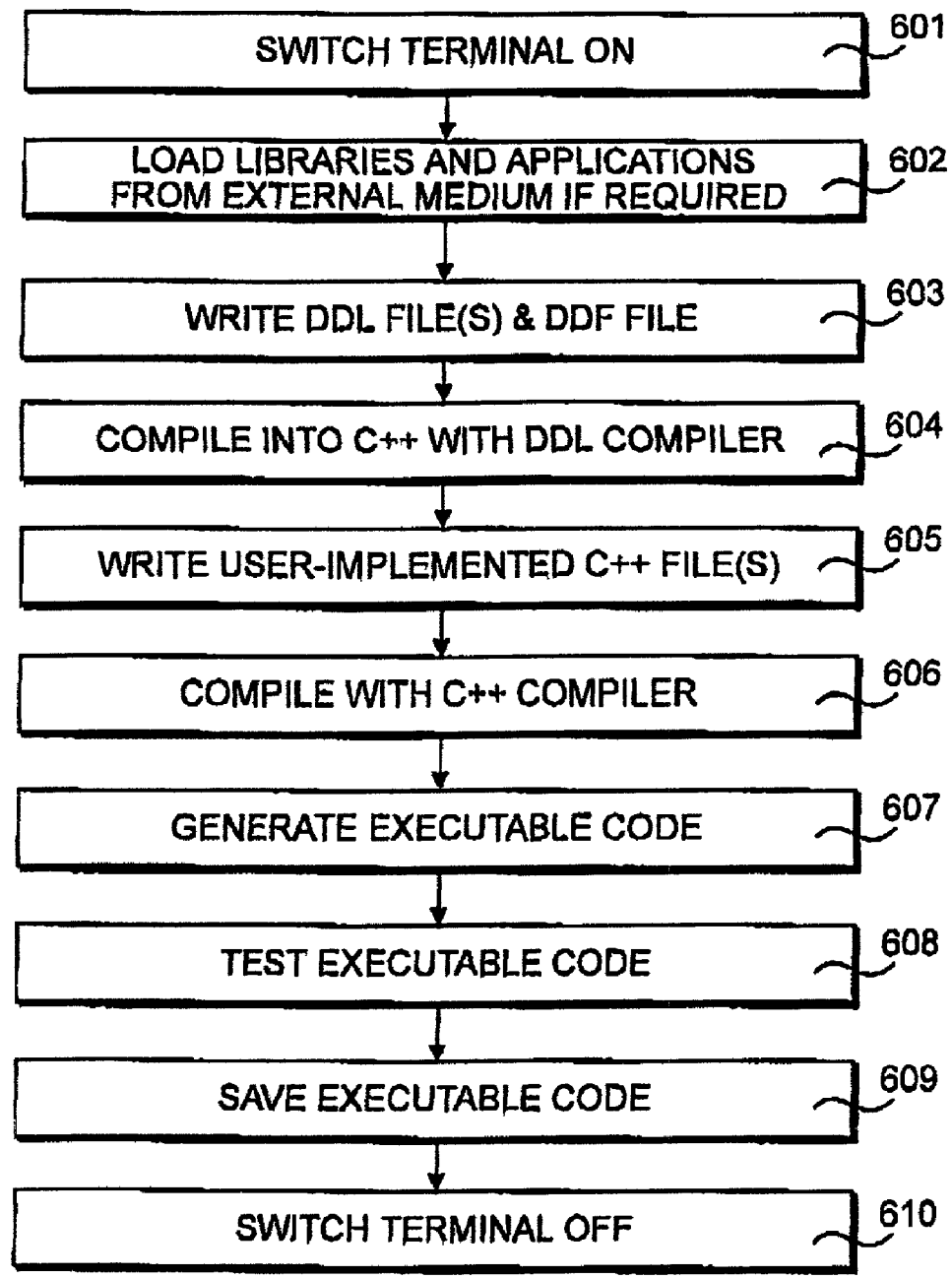
FIG. 6 details operations for generating an instructions set executable by a user terminal equipped with processing means, including network-specific instructions for sharing objects, shown in FIG. 2 according to the invention.

The successive operations required to generate an executable instructions set, including network specific instructions for sharing objects, according to the invention are detailed in FIG. 6.

FIG. 6

Upon activation of a computer programming system such as is detailed in FIG. 3 at step 601, the programming application 502. DDL compiler 203, C++ compiler 103, DDL library 207 and C++ library 105 necessary for the generation of a program according to the invention are loaded from an external medium, such as CD-ROM 304, or zip disk 307 or downloaded from a network, such as LAN 311 or the Internet at step 602.

At step 603, the programmer operating computer programming system 302 implements object classes and datasets in DDL files 201 and the definition thereof in DDF file 202 by means of strings of ASCII characters inputted by means of keyboard 309 and/or mouse 310. Upon completing the inputting action of step 603, the DDL fees and the DDF file generated are compiled with the DDL compiler 203 at step 604. At step 605, the programmer 301 implements programmer-defined classes, such as user classes 206 and application instructions 102 in a manner similar to the implementation of the DDL files and the DDF file. Upon completing the inputting action of step 605 and once all of the necessary source files have been implemented, then said source files are compile into an object file by the C++ compiler 103, at step 606.

The completion of the compilation operation of step 606 by means of the linking operation executed by the linker 104 with DDL library 207 and C++ library 105 results in the generation of an executable instruction set 208 at step 607. At step 608, said executable instruction set or program, is tested i.e., the executable instruction set is processed by CPU 401. In a preferred embodiment of the present invention, said testing operation of step 608 is carried out simultaneously by a plurality of network connected terminals, such that the validity and accuracy of the object distribution functionality of said program can be assessed from the earliest generation of the executable instruction set. At step 609, the executable instruction set 208 is written to hard disk drive 405, or zip disk 307, or CD-RAM 305. Upon completing the writing operation of step 609, the computer programming system 302 can then be switched off at step 610.

Figure 7:
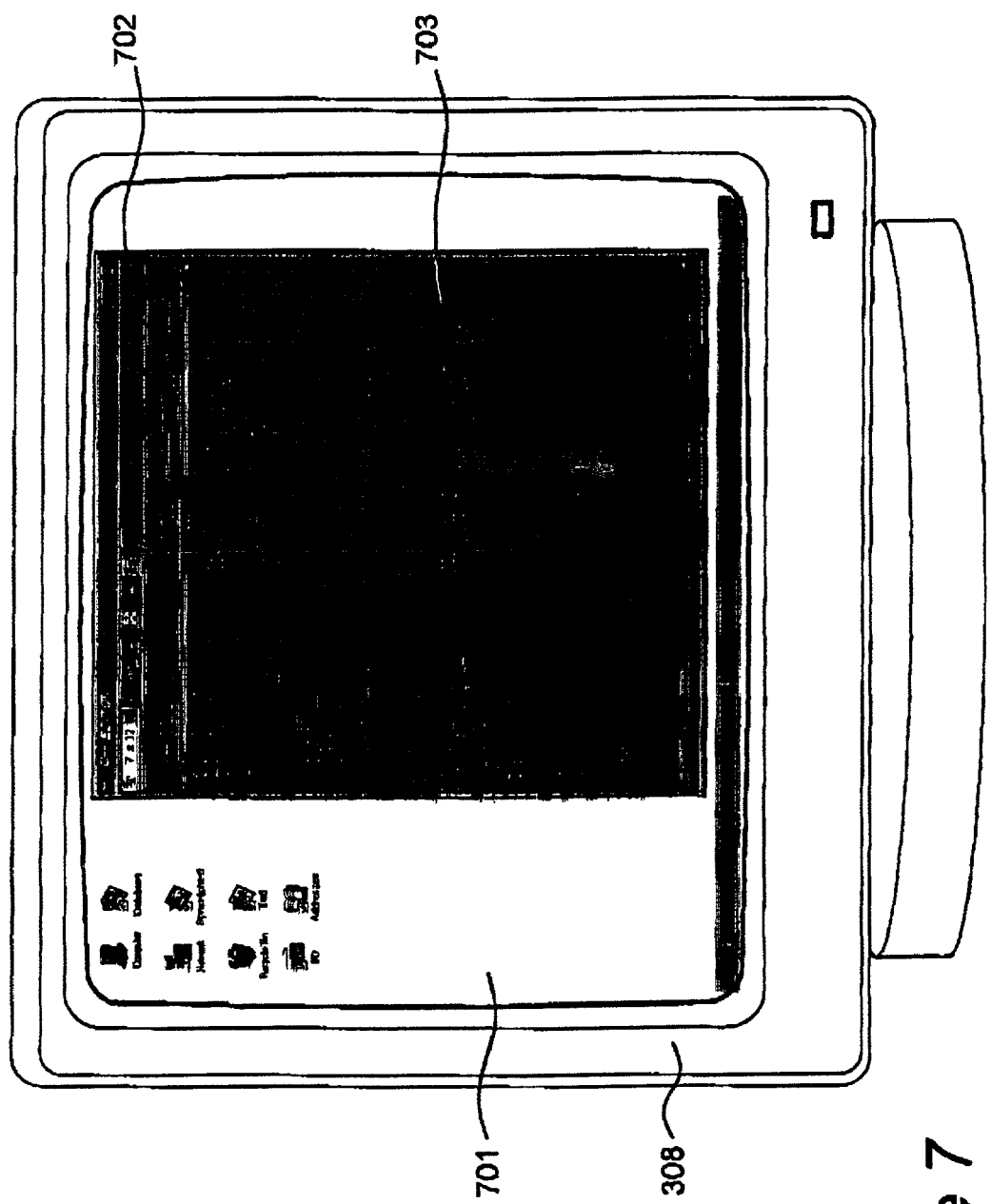
FIG. 7 shows a graphical user interface for generating an instructions set displayed on visual display unit shown in FIG. 3.

A representation summarising the operating environment generated from steps 601 and 602 is illustrated in FIG. 7.

FIG. 7

A graphical user interface (GUI) 701 is presented to programmer 301, generated by the operating system 501, by means of which selections may be made for particular tasks to be executed, i.e. applications such as programming application 602 to be processed by CPU 401. Upon completing step 602 and instructing the computer programming system 302 to execute the programming application 502, a GUI 702 is presented to programmer 301, generated by the programming application instructions. Said instructions provide for the instantiation of a visualising area 703, wherein strings of ASCII characters inputted by programmer 301 by means of keyboard 309 and/or mouse 310, can be displayed. Part of the functional of programming application 502 enables programmer 301 to utilise visualising area 703 as a text editor, wherein inputted strings of ASCII characters can be manipulated and edited for the purpose of completing steps 603 through to 607.

According to the invention and following procedures familiar to those skilled in the art, the object classes are first implemented in the DDL file 201 at step 603. In a multi-user program, such as a multi-player game designed to involve network-connected players, or a more business orientated application such as an on-line transaction management program, program objects need to be distributed across the network in order for remote terminal users to interact with said objects. Object duplication is the mechanism implemented by the Data Definition Language according to the invention to achieve this function. Thus, the two most important object classes which require implementation in said DDL file are the duplicated object class and the dataset class, which respectively define all the objects that belong to the application and require sharing and their related datasets. Said duplicated objects are declared using duplicate object classes. Thus, a duplicated object is an instance of a duplicated object class, and multiple instances of the same duplicated object class may be created. When implementing object classes as duplicated object classes within DDL files, whenever an instance of a duplicated object class is created on a given networked terminal, copies of said instance will automatically be created on all of the other remote terminals connected to the same network. The local duplicated object is called the duplication master, while the others are its duplicas. Co-pending United Kingdom patent application No. 00 26 095.0 of the present Assignee may be usefully consulted for reference to a more detailed description of duplicated objects and their functionality, which is not part of the present invention.

A duplicated object class is declared in a DDL file and said declaration includes datasets and, if necessary, methods. An example of the ASCII contents of a DDL file and the ASCII contents of a DDF file according to the invention are respectively shown in FIG. 8.

FIG. 8

In the example, programmer 301 is writing a program, the purpose of which is for each user operating a networked terminal to control a three-dimensional cube whilst being able to observe the respective three-dimensional cubes of the other users connected to the network. A DDL file 801 is therefore created, which programmer 301 calls 'CubeAni.DDL'. Said DDL file 801 declares a duplicated object class 'GeoObject' 802 and a relevant declaration 803 pertaining to a dataset 'Position', which refers to a dataset class which will be implemented within the DDL file 801 at a later stage. Declarations 802 and 803 implement a duplicated object class 'GeoObject' as a template for a geometrical object equipped with a three-dimensional position.

Programmer 301 subsequently implements a duplicated object class 'Cube' 804 which is shown to refer to the 'GeoObject' 802 as its inheritance class. A relevant declaration 805 is also implemented pertaining to a dataset 'CubeData', which refers to a dataset class which will be implemented within the DDL file 801 at a later stage. Declarations 804 and 805 implement a duplicated object class 'Cube' equipped with a 'CubeData' dataset and, as said duplicated object class 'Cube' inherits from the duplicated object class 'GeoObject' 802, said duplicated object class 'Cube' will also include the dataset 'Position' by means of declaration 803

Programmer 301 subsequently implements the dataset classes corresponding to dataset declarations 803 and 805 respectively. A dataset class 'Position' 806 is implemented, which includes dataset attributes 807 that can be any number of any simple data types and, in the example, contains the variables X, Y and Z which give the three-dimensional location of a cube. Programmer 301 also implements a dataset class 'CubeData' 808, which includes a dataset attribute 809 that, in the example, is a 'Texture' variable that defines the appearance of a cube.

As was previously detailed, the duplicated object class definition file (DDF) defines the duplicated object classes that belong to the application. Said DDF file also defines global application information, such as the application title, which is necessary as it is used to authenticate any networked terminal which tries to join the distributed application. A DDF file 811 is thus created with appropriate strings of ASCII characters to correspond to the duplicated object classes declared in the DDL file 801. The DDF 811, which programmer 301 calls 'CubeAni.DDF', provides an application title definition 812 and duplicated object classes definitions 813 and 814 relating respectively to the declaration of the duplicated object class 'GeoObject' 802 and the duplicated object class 'Cube' 804 within the DDL file 801. Programmer 301 eventually completes the inputting of strings of ASCII characters required for the completion of the DDL file 801 and the DDF file 811 as according to step 603.

Figure 9:
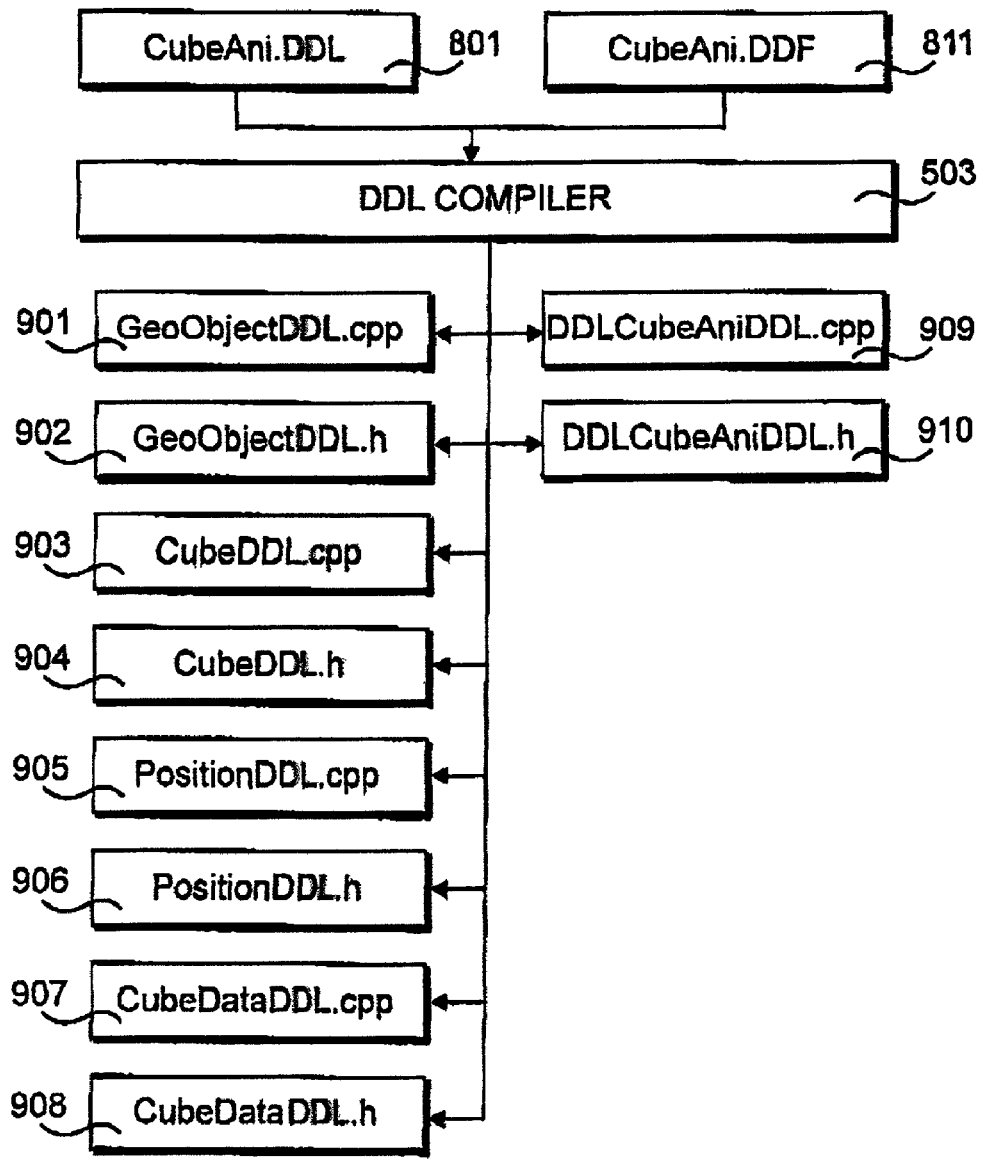
FIG. 9 provides a graphical representation of the source and header files generated by the DDL compiler shown in FIGS. 2 and 6.

According to the invention, when the application built with the Data Definition Language is compiled, the DDL and DDF files are used by the DDL compiler 203 to generate the duplicated object classes and dataset classes and their respective and relevant source and header files in C++ programming language. A graphical representation of the C++ source and header files generated by the DDL compiler 203 according to the invention, is shown in FIG. 9.

FIG. 9

At step 604, the 'CubeAni.DDL' file 801 and the 'CubeAni.DDF' file 811 are submitted to the DDL compiler 203 and the compiler then generates a variety of source and header files dependent upon the contents or the identity of the file submitted.

From the DDF file, the DDL compiler 203 generates C++ source and header files with the file names 'DDFfile nameDDF.cpp' and 'DDFfilenameDDF.h' respectively. For each duplicated object and dataset declaration implemented in the DDL file, the compiler also generates the respective C++ DOCLASS and DATASET classes, along with their corresponding source and header file, with the names 'ClassNameDDL.cpp' and 'ClassNameDDL.h'. Thus, in the example, a 'GeoObjectDDL.cpp' source file 901 and a 'GeoObjectDDL.h' header file 902 are generated by the DDL compiler 203 from the duplicated object class 'GeoObject' 802. Likewise, a 'CubeDDL.cpp' source file 903 and a 'CubeDDL.h' header file 904 are generated from the duplicated object class 'Cube' 804; a 'PositionDDL.cpp' source file 905 and a 'PositionDDL.h' header file 906 are generated from the dataset class 'Position' 806; and a 'CubeDataDDL.cpp' source file 907 and a 'CubeDataDDL.h' header file 908 are generated from the dataset class 'CubeData' 808. Referring to the corresponding DDF file 811, which is named 'CubeAni.DDF', a 'DDLCubeAniDDL.cpp' source file 909 and a 'DDLCubeAniDDL.h' header file 910 are generated by the DDL compiler 203 from said DDF file 811.

Figure 10:
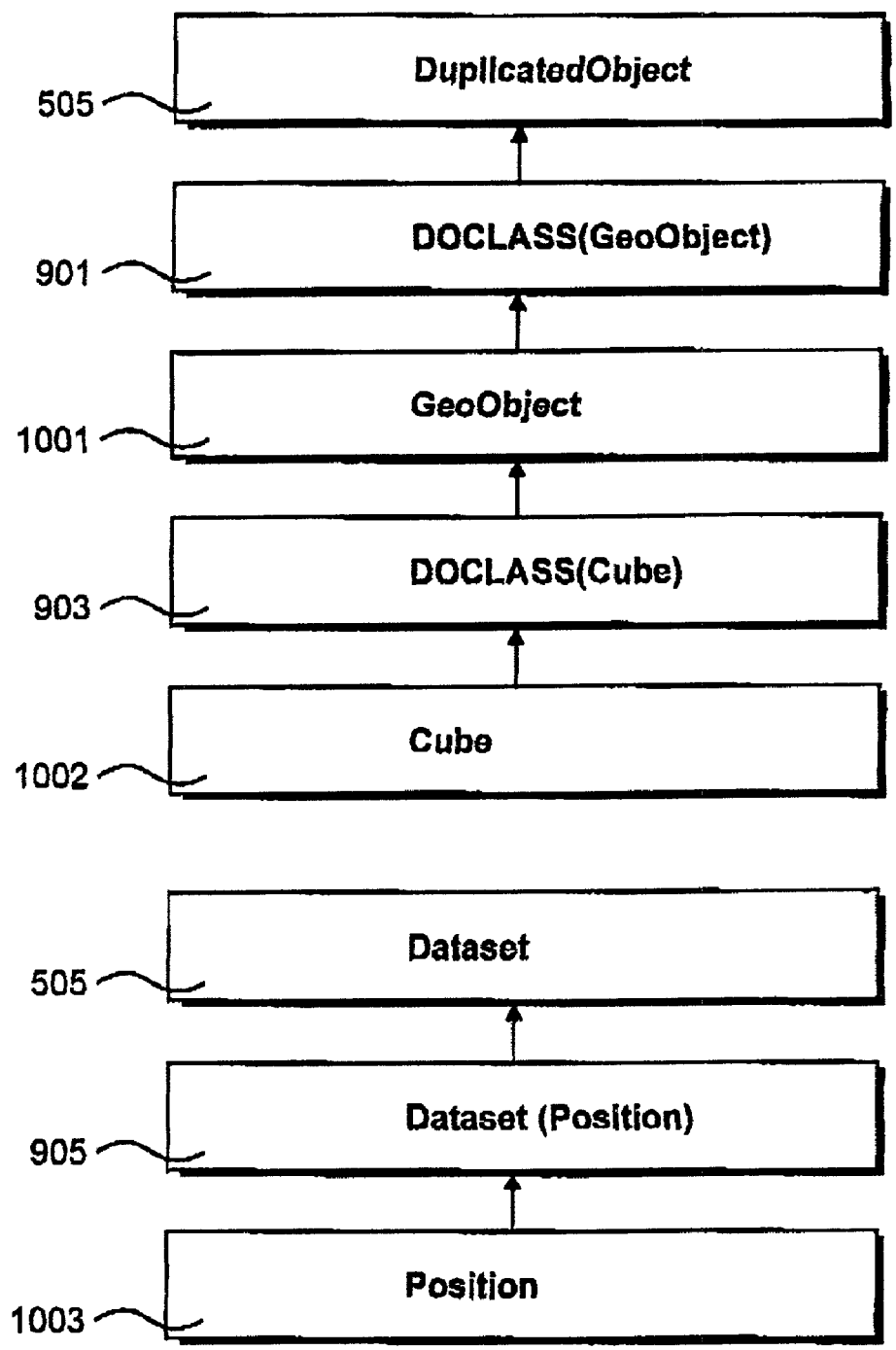
FIG. 10 provides a graphical representation of the principle of class inheritance according to the invention.

As the application's duplicated object classes, corresponding datasets classes and remote methods have now been defined and declared in the Data Definition Language according to the invention, and subsequently been compiled according to step 604 thus made available as source and header files for inclusion directly in files written by means of the same programming application 502 according to the C++ programming language syntax, programmer 301 can now declare the application's object classes and methods in said C++ source files as said object classes and methods will inherit from said duplicated object classes and datasets classes according to the invention. The principle which governs said class inheritance is illustrated in FIG. 10.

FIG. 10

In FIG. 8, it was detailed that the duplicated object class 'Cube' 804 referred to the duplicated object class 'GeoObject' 802 as its inheritance class, according to the DDL syntax:

doclass Cube: GeoObject,

This string of ASCII character declares that the duplicated object class 'Cube' 804 is an instantiation of the duplicated object class 'GeoObject' 802 and, as such, it is to include all of the member variables and member functions (803) of the inheritance class (802), in addition to its own (805).

According to the invention, for every duplicated class and data set class specified in the DDL file 801 and defined in the DDF file 811, programmer 301 must implement a C++ class that inherits from the Data Definition Language-generated class. Accordingly, when implementing user classes 206 in C++ source files using C++ programming language syntax, programmer 301 declares that the C++ class 'GeoObject' 1001 inherits from the C++ class DOCLASS(GeoObject) 901 and that the C++ class 'Cube' 1002 inherits from the C++ class DOCLASS(Cube) 902. As it was established that the duplicated object class 'Cube' inherits from the duplicated object class 'GeoObject', and as said duplicated object class 'GeoObject' inherits from the root class 'duplicated object' since it was declared as not inheriting from another duplicated object class (802), then the C++ class 'Cube' 1002 eventually inherits from the root class 'duplicated object' which is stored in the DDL library 207. Likewise, the C++ class 'position' 1003 is declared as inheriting from the C++ class DATASET(Position) 905 and thus eventually inherits from the root class 'dataset', which is also stored in the data set library 207.

Figure 11:
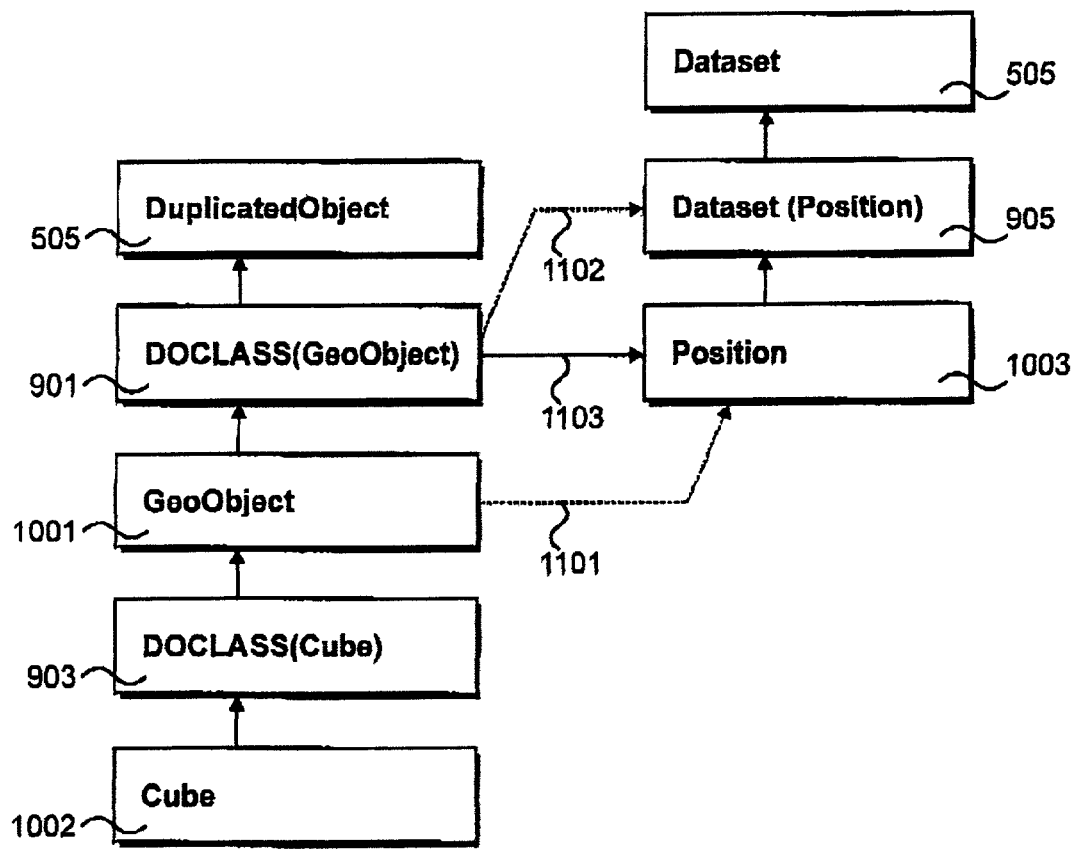
FIG. 11 provides a graphical representation of the relationship between object classes and dataset classes shown in FIG. 10.

For duplicated objects, the C++ class generated by the DDL compiler encapsulates all of the network instructions, i.e. how to instantiate a class and ensure that it is discovered on all remote networked terminals, how to ensure that when the variables of a duplicated object changes its duplicas are updated appropriately and how to remotely call duplicated objects methods if required. This situation requires that the user-implemented class which declares the data set variables in the C++ source file is made available when the duplicated object is instantiated. The relationship between duplicated objects and data set classes within the scope of the principle of inheritance instantiated by the present invention is illustrated in FIG. 11.

FIG. 11

It was previously explained that the user-implemented C++ class 'Cube' 1002 eventually inherits from the root class 'duplicated object' and that the user-implemented C++ class 'Position' 1003 eventually inherits from the root class 'dataset'. According to the prior art, an object class/dataset relationship 101 would be established by programmer 301 at the level of the C++ class 'GeoObject' 1001 with the C++ class 'Position' 1003 in order to update the position of the remote instantiations of said object and thus require extensive additional networking instructions, such as networking instructions 107. Similarly, the relationship 1102 which would be implemented according to the prior art by programmer 301 between C++ class DOCLASS(GeoObject) 901 and C++ class DATASET(Position) 905 would result in the exclusion of the portion of user classes 206 pertaining to the dataset 'Position' 1003.

The higher C++ duplicated object class 901 implemented according to the invention already includes said networking code and relationships 1101 and 1102 do not require implementing by programmer 301 at all, since the DDL compiler 203 will implement the appropriate relationship 1103 between the highest object class, which is the C++ class DOCLASS(GeoObject) 901 and the lowest user-implemented C++ dataset class which is the dataset 'Position' 1003, such that code added in the user-implemented C++ classes is available when a duplicated object is instantiated by the application and changes in the dataset, i.e. position, are distributed to the remote instantiations of said object.

An example of the implementation of the above principal of inheritance according to the invention is illustrated in FIG. 12, wherein strings of ASCII characters are inputted by programmer 301 which declare user classes 206 as inheriting from DDL compiler-generated C++ duplicated objects and dataset classes.

FIG. 12

In accordance with the structuring rules inherent to C++ programming language, programmer 301 must input a first set of declarations 1201, the purpose of which is to indicate to the C++ compiler 103 which will be used at step 606, which C++ header file to link the following declarations with. Consequently, the DDL compiler-generated C++ header files 902, 904, 906 and 908 are included for this purpose.

The next set of instructions 1202 implemented by programmer 301 declares the user-defined class 'GeoObject' 1001 and refers to the DDL compiler-generated C++ class DOCLASS(GeoObject) 901. After the declaration of class 1001 and its inheritance class, the programmer can subsequently implement variables necessary for the CPU 401 to process said object locally. In the example, programmer 301 may input ASCII characters outlining the fact that an object is three dimensional, therefore has X, Y, Z attributes. The following set of declarations 1203 declares a user-defined class 'Cube' 1002 which is shown to inherit from the DDL compiler generated C++ class DOCLASS(Cube) 903. As previously described, upon establishing said user-defined class 'Cube', the programmer 301 can then implement attributes and methods pertinent to the class declared and, in the example, programmer 301 may implement instructions which enable a program user to resize the three-dimensional cube.

Eventually, all DDL compiler-generated C++ classes DOCLASS are declared in the user-defined classes 206 and DDL compiler-generated C++ classes DATASET can be implemented next. Accordingly, a set of declarations 1204 is inputted which declares a user-defined C++ class 'Position' 1003 which inherits from the DDL compiler-generated C++ class DATASET(Position) 905. Upon completing the first declaration string, programmer 301 is subsequently able to implement methods pertaining to the reading of the user-input, i.e. translate key strokes or mouse movements into X, Y, Z coordinates with which to amend the position of the three-dimensional cube.

Figure 13:
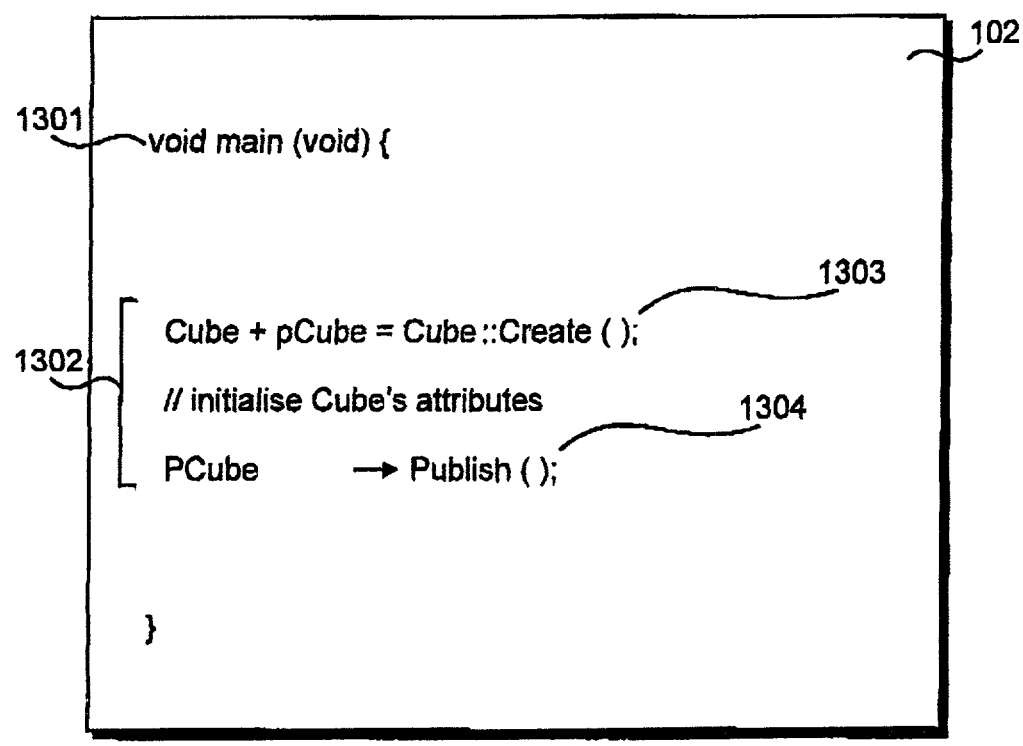
FIG. 13 illustrates the ASCII contents of a users implemented source file declaring application instructions 102 shown in FIGS. 2 and 6.

As user classes and the related methods have now been declared in a C++ source file, the last C++ source files to be created by programmer 301 are the application instructions 102, an example of the strings of ASCII characters of which is illustrated in FIG. 13.

FIG. 13

Until the step wherein programmer 301 implements application instructions 102, all of the previous implementations relate to the definition and declaration of objects pertinent to the purpose of the application as a complete set of executable instructions, their role and behaviour within the application and their interdependencies between one another. Eventually, the CPU 401 of the user terminal which will run the executable instructions set must be instruct about the preferred method of instantiating said objects in the main memory of said user terminal and subsequently manage the interaction between the terminal user and the object instantiated. Consequently, a set of declarations 1301 is implemented by program 301 which, when later compiled by C++ compiler 103, linked by linker 104 and generated as an executable instructions set 208 and processed by the CPU 401 of a user terminal, will instruct said CPU that the declarations following the set of declarations 1301 constitute the first program step to be processed.

According to the invention, the first program step to be preferably processed by the CPU 401 of a networked connected user terminal is to instantiate a 'GeoObject' duplicated object and, particularly, a 'Cube' duplicated object in the main memory of said network-connected user terminal. It was previously explained that a 'Cube' duplicated object inherits from a 'GeoObject' duplicated object and that said 'GeoObject' duplicated object has no displayable properties, as it is an abstract template for a specific instance thereof, such as a Cube in the example, and its distribution embodies mostly the distribution of the shared datasets of the particular class of object to which said Cube belongs, i.e. positional variables and their local and remote update, in order for the user of a networked terminal to see and interact with an instantiation of the 'GeoObject' duplicated object, the 'Cube' duplicated object is therefore implemented by programmer 301 as a second set of declarations 1302.

Said second set of declarations 1302 includes a first subset 1303 of declarations, the purpose of which is to instantiate a 'Cube' duplicated object in the main memory and a last subset 1304 of declarations, the purpose of which is to publish the 'Cube' duplicated object instantiation over the network, i.e. to distribute it to other remote user terminals running the same executable instruction set. According to the invention, dataset classes do not need to be directly instantiated by means of the above method 1302 to 1304 as they are implemented as member variables by the Data Definition Language-generated instructions.

Upon completing the inputting of strings of ASCII characters required for the completion of the generation of application instructions 102, programmer 301 subsequently submits all of the C++ source files generated at this stage, which include: the DDL compiler- generated C++ source files for duplicated object classes 204 and for dataset classes 205, C++ source files generated as user classes 206 and C++ source files generated as application instructions 102 to C++ compiler 103. It should be observed that the C++ programming language used in the Description is for the purpose of example only, and that the flexibility of the Data Definition Language according to the invention allows for the generation by DDL compiler 103 of source files in a variety of other object-oriented programming languages known to those skilled in the art, such that they could interact with one another.

An object file is generated by C++ compiler 103 which includes all of the declarations contained in all of the above C++ source files. C++ functions declared within the source files pertaining to user classes 206 and application instructions 102 are linked to C++ library 105 by means of linker 104 according to the prior art and C++ functions declared within the C++ duplicated object classes 204 and C++ dataset classes 205 are also linked by means of linker 104 to DDL library 207 according to the invention.

Upon completing the compilation step 606 and its inherent linking operation which eventually generates executable code at step 607, an executable instruction set 208 is obtained which, to the contrary to the prior art known to those skilled in the art, can now be tested not only locally but also remotely within a network environment at step 608. In the example, said executable instruction set 208 is called 'Cube Application', and the fist release available for testing traditionally does not include networking functionality. According to the prior art, only a more advanced version of 'Cube Application', which includes networking functionality, would usually be made available for terminal users to test over networks such as the Internet, as the said version without networking functionality would first be extensively processed locally to check that the instructions are satisfactorily processed by a standalone user terminal, and networking instructions 107 would only then be implemented.

Figure 14:
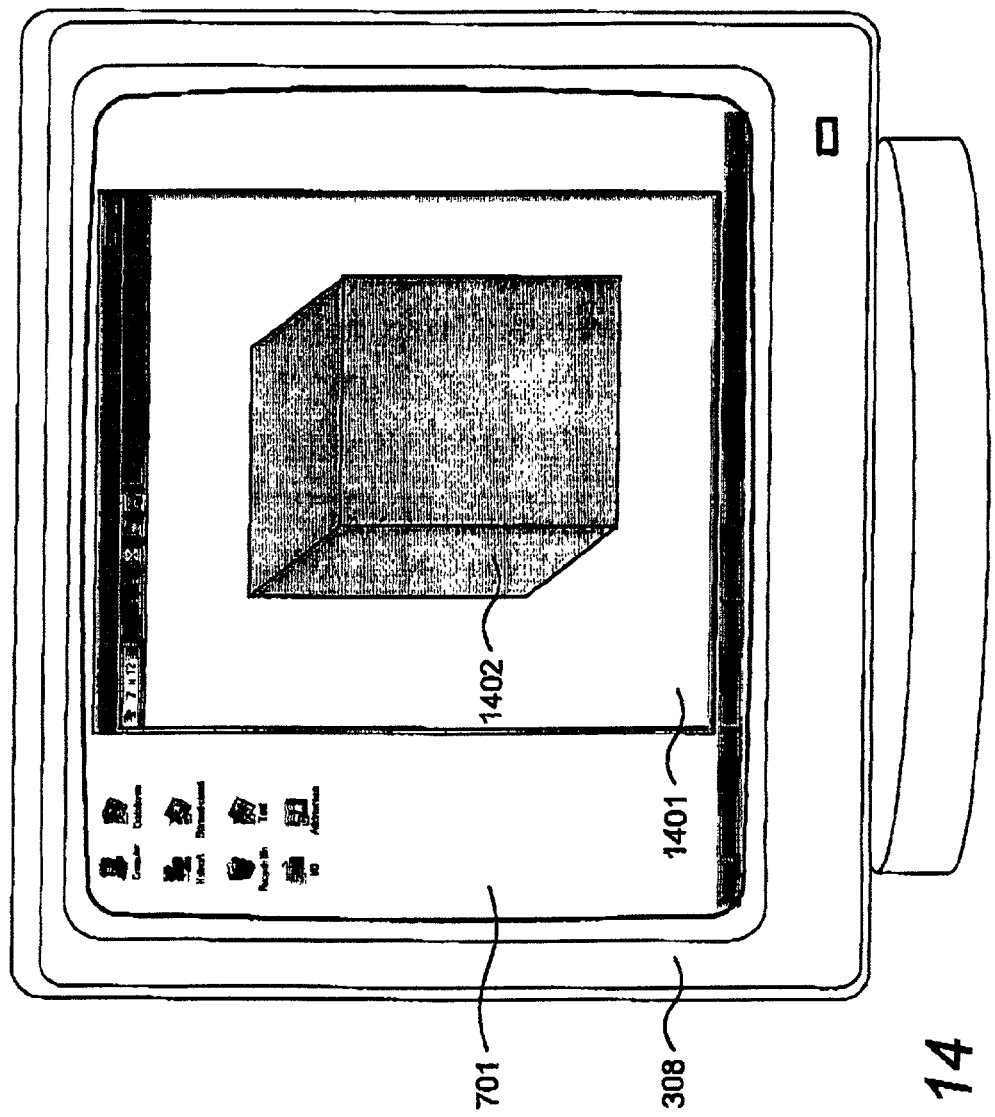
FIG. 14 shows a graphical user interface of the executable instructions set shown in FIGS. 2 and 6.

A representation of the 'Cube Application' Graphical User Interface (GUI) of the 'Cube Application' executable instruction set 208 is shown in FIG. 14.

FIG. 14

The video display unit 308 of programming computer system 302 is shown and displays the graphical user interface 701 of the operating system 501 as stored in the main memory of said programming computer system 302. As the cube application 208 is generated and also stored in said main memory 404, programmer 301 instructs CPU 401 to execute the instructions set 208 at step 608, wherein the GUI 1401 of cube application 208 is displayed on VDU 308. Subsequently to the instantiation of said GUI 1401, CPU 401 sequentially executes declarations 1301 and 1302, wherein a duplicated object 'Cube' is instantiated in main memory 404, equipped with member variables and member functions. With reference to the principle of inheritance explained thereabove, said duplicated object 'Cube' inherits from the duplicated object 'GeoObject' and is therefore instantiated as a three-dimensional object equipped with a three-dimensional position and, as the class of said duplicated object 'Cube' declares a 'CubeData' dataset which specifies a texture variable, said duplicated object 'Cube' can therefore be rendered with said texture and subsequently displayed as a cube model 1402 within the GUI 1401 of cube animation 208. Whereas the execution of the version without networking functionality of Cube Application 208 to this point, according to the prior art, would establish that said Cube Application 208 can be processed locally in a stable manner, and whereas networking instructions 107, 108 and 109 would only be implemented at this stage according to said prior art, the initial version of the Cube Application 208 generated according to the invention can be directly tested at step 608 over networks as the networking instructions are already embedded within the objects. Consequently, said initial version is distributed to network-connected terminals by means of Zip disk 307, CD RAM 305 or as a download over a network such as the Internet 312. When another networked terminal eventually runs Cube Application 208 on said network, CPU 401 executes the next declaration 1303, wherein said duplicated object 'Cube' is published to said other terminal and the cube model 1402 is rendered as a second cube model within the GUI of the remote Cube Application 208.

Figure 15:
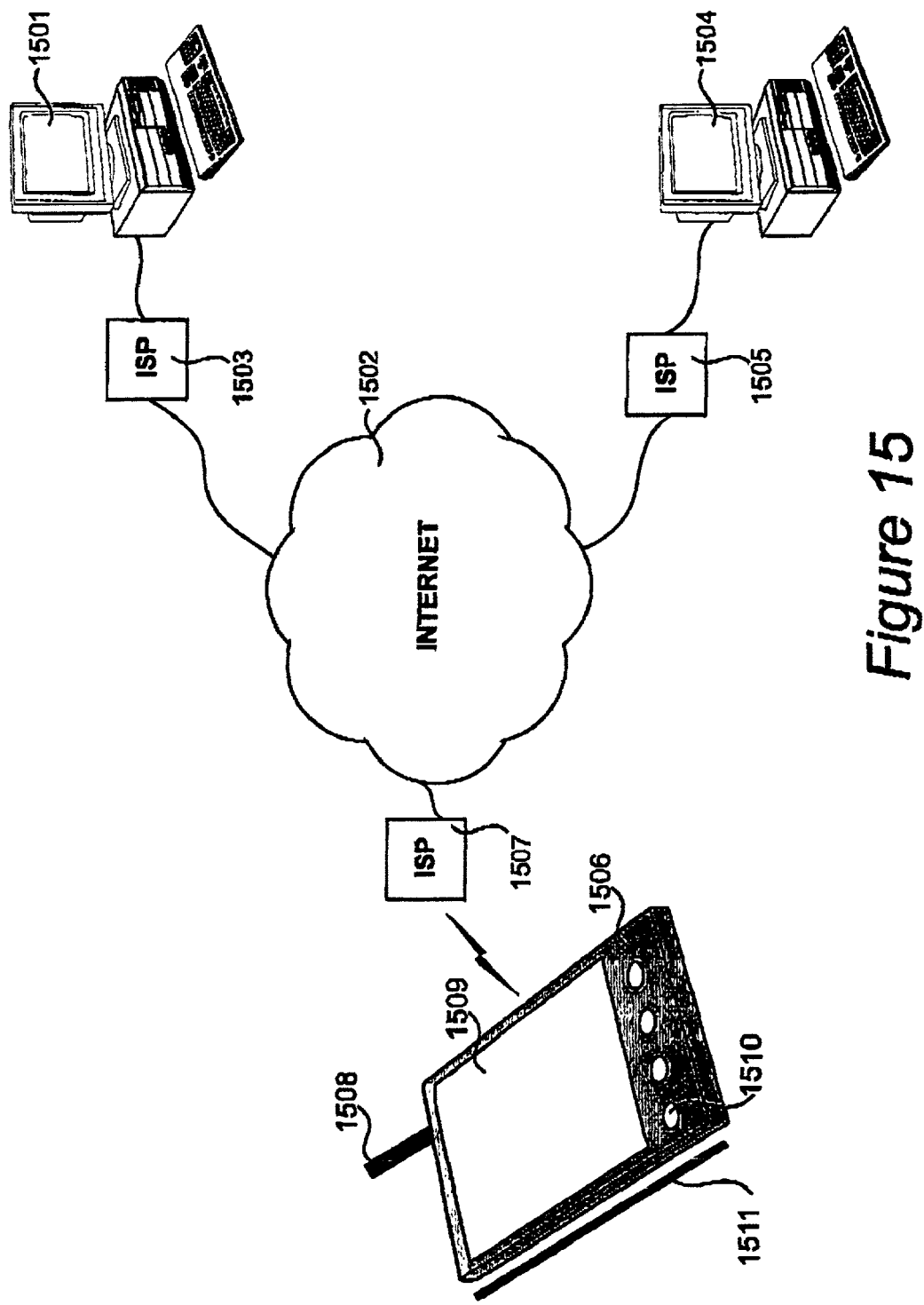
FIG. 15 illustrates a network environment, including user terminals equipped with processing means and sharing objects generated by the executable instruction set shown in FIGS. 2 and 6 over said network environment.

A network environment is shown in FIG. 15, which includes user terminals and a mobile device sharing data over said network environment in order to test the 'Cube Application'.

FIG. 15

User terminal 1501 is connected to the Internet 1502 via Internet service provider (ISP) 1503 and user terminal 1504 is also connected to the Internet 1502 via internet service provider (ISP) 1505. Internet-enabled mobile device 1505, which is a Palmtop PC, is connected wirelessly to the Internet via internet service provider (ISP) 1507. Each of said ISPs 1503, 1605 and 1507 provide each individual user with a unique network address, e-mail account and other optional internet facilities such as are commonly provided to a user with an ISP account. Thus, there is provided the scope for any which one of the above user terminals to access data stored on any which one of the other networked terminals.

In a preferred embodiment of the present invention, the user terminals sharing data such as shown in FIG. 15 can include many types of devices equipped with processing and displaying means, the respective configurations of which can vary to a fairly large extent and may thus constitute as many independent platforms for which to implement platform-specific user classes, such as user classes 206, and application instructions, such as application instructions 102.

In the example, user terminals 1501 and 1504 are Personal Computer with a hardware structure similar to programming computer system 302, and palmtop personal computer 1506 is shown equipped with an antenna 1508 through which incoming and outgoing wireless signals are transmitted and, according to the known art, palmtop PC 1506 is equipped with a processing capability and memory means. Output data is displayed on a tactile visual display unit 1509 and manual input is received via a number of function-specific keys 1510 and a stylus 1511, which activates instructions displayed on display 1509 by means of its tactility. Consequently, although palmtop PC is configured to process processor instructions in a manner similar to terminals 1501 and 1504, its operating system is different by design and thus constitutes a separate platform. For the purpose of clarity in the example, the Cube Application 208 is generated for processing by both personal computers 1501, 1504 and palmtop PC 1506, by means which will be familiar to those skilled in the art.

Figure 16:
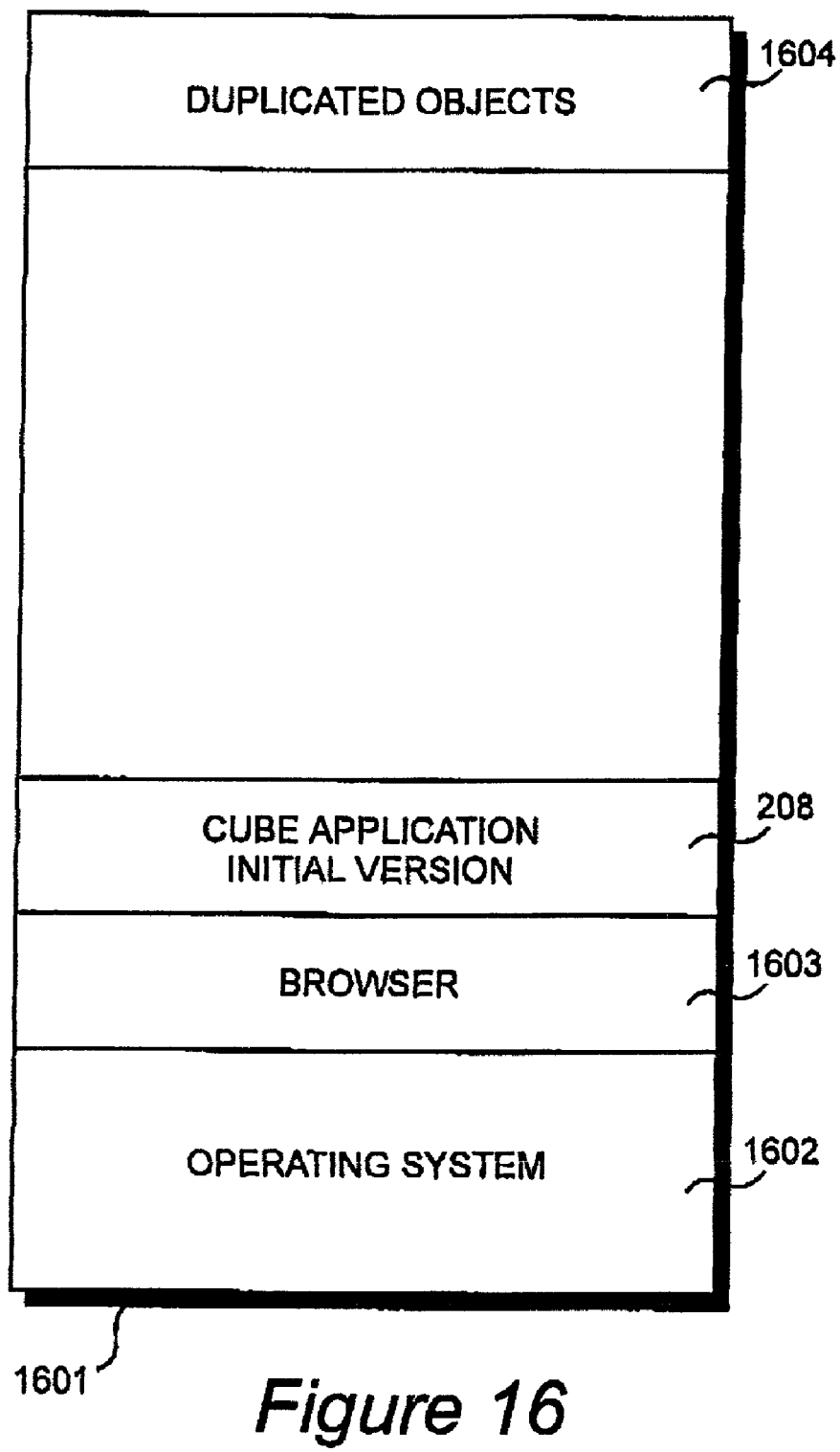
FIG. 16 details contents of the memory of each user terminal shown in FIG. 15, including the executable instructions set shown in FIGS. 2 and 6.

Upon user terminals 1501, 1504 and 1506 accessing the initial version of Cube Application 208 by means of an external medium or by means of a network download, each of said terminals loads the Cube Application into its respective main memory, a representation of which is shown in FIG. 16.

FIG. 16

A main memory 1601 is graphically illustrated which represents each of the respective main memories of user terminals 1501, 1504 and 1506. An operating system 1602 is shown which, in the case of user terminals 1501 and 1504 is for instance Microsoft Windows 2000. In the case of user terminal 1506, which is a palmtop PC, said operating system 1602 is for instance Microsoft Windows CE. Main memory 1601 also includes a browser 1603 which is capable of processing HTML (Hypertext Mark-Up Language) or JAVA instructions embedded within web pages accessed on the Internet 1502, Main memory 1601 includes the initial version of cube application 208 which, as previously explained, was loaded from zip disk 307, CD RAM 305 or downloaded from the Internet 1502. Main memory 1601 eventually includes duplicated objects 1604 which, in the example, are a 'GeoObject' duplicated object and a 'Cube' duplicated object, upon the respective CPU of each user terminal 1501, 1504 and 1506 processing the instructions set contained within said initial version 206.

Figure 17:
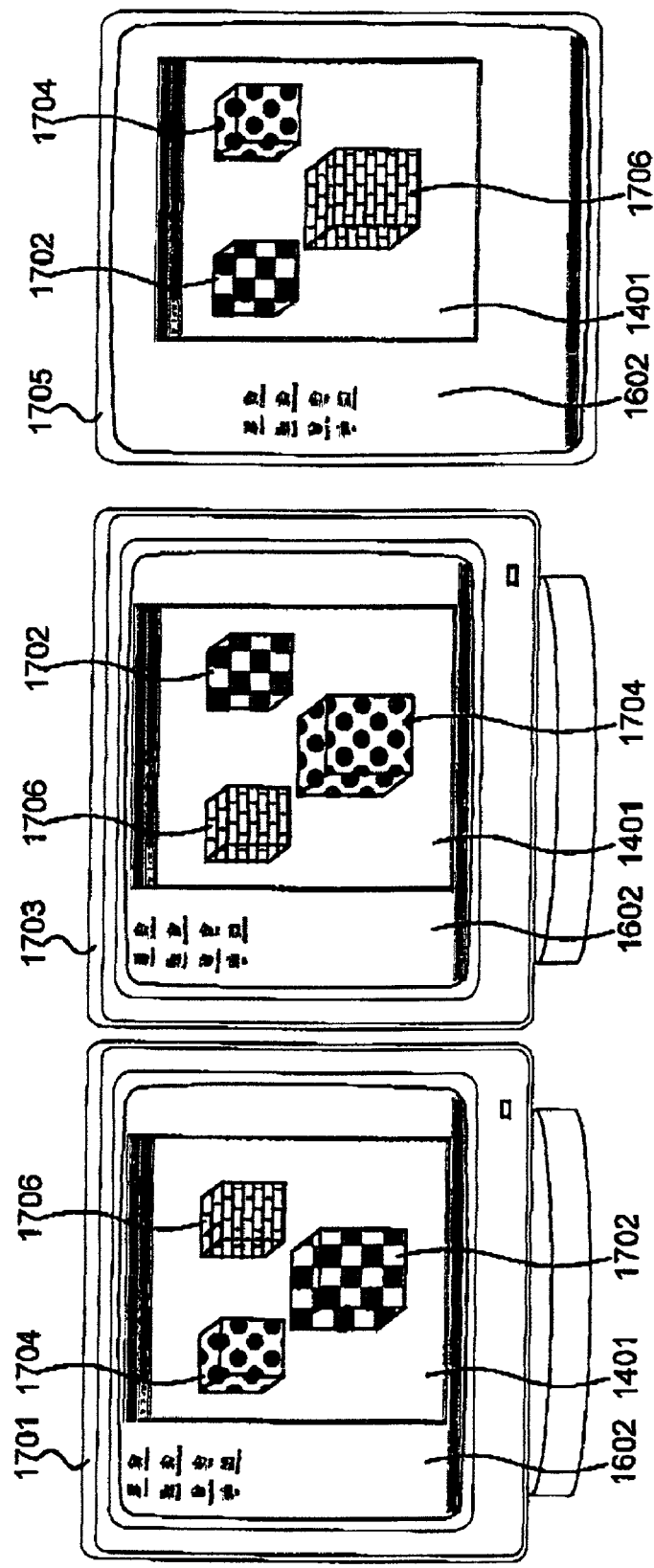
FIG. 17 shows the respective visual display unit of each user terminal shown in FIG. 15 and displaying the GUI of the executable instructions sets shown in FIG. 14.

User terminals 1501, 1504 and 1506 are now configured to process the Cube Application 208 and share their respective Cube objects, which is the purpose of the code implemented by programmer 301. The representations of the 'Cube Application' GUI of each of said user terminals are shown in FIG. 17 as the 'Cube Application' executable instruction set is tested over a network according to the invention.

FIG. 17

It was previously explained that, upon instructing the CPU to process the executable instructions set 208, said CPU instantiates a GUI 1401 of the cube application 208, a non-displayable duplicated object 'GeoObject' and a displayable duplicated object 'Cube' which is three-dimensional, has a three-dimensional position and is equipped with a texture. Consequently, upon the CPU of user terminal 1501 processing the cube application 208 stored in its main memory, the VDU 1701 of said user terminal 1501 displays a GUI 1401 of the cube application 208 and a duplicated object 'Cube' 1702 equipped with a texture, with said texture possibly being chosen by the user of terminal 1501.

Similarly, the VDU 1703 of user terminal 1504 displays a GUI 1401 of the cube application 208 and a duplicated object 'Cube' 1704 equipped with a texture with said texture possibly being chosen by the user of terminal 1504 and different to the texture chosen by the user of terminal 1501.

Similarly, the VDU 1705 of user terminal 1506 displays a GUI 1401 of the cube application 208 and a duplicated object 'Cube' 1706 equipped with a texture, with said texture possibly being chosen by the user of terminal 1506 and different to the textures respectively chosen by the users of terminals 1501 and 1504.

As the duplicated object 'GeoObject' and the duplicated object 'Cube' were implemented as sets of declarations 1302 and 1305 respectively, which included the respective subsets 1304 and 1307 for the purpose of publishing said instantiations of duplicated objects over the network to every networked user terminal which executes the same executable instructions set 208, the duplicated object 'Cube' 1702 is published at remote user terminals 1504 and 1506, where it is stored as a duplicated object 1604 in the main memory 1601, is then processed by the CPU according to the local Cube application 208 and then displayed in the respective GUI 1401 of said remote user terminals. Consequently, it is possible for the user of network terminal 1501 to observe his local duplicated object 'Cube' 1702, which is a duplicate master, and the remote duplicated objects 1704 and 1706, which are duplicas, instantiated by the Cube applications 208 respectively processed by networked terminals 1504 and 1506. If the user of network terminal 1501 modifies the three-dimensional coordinates of the cube 1702 or its texture, then the duplicas stored and displayed at network terminals 1504 and 1506 will be accordingly updated by means of the duplicability of cube 1702 datasets, and reciprocally for cubes 1704 and 1706 of networked terminals 1504 and 1506 respectively.

Therefore, the present invention provides a programming language defined as the Data Definition Language, which enables programmers of networked applications to describe shared applications' objects and data structures at the onset of an application development process. As the functionality of said Data Definition Language embeds networking instructions into said objects and structures, the validity of programmer-implemented application instructions and user-defined classes of said application can be tested over a network much more easily, rapidly and thus economically than according to the prior art. Finally, as the object classes generated from said Data Definition Language already include all the shared member functions and member variables, and can be generated by means of the DDL compiler in a generic format compatible with most object oriented languages, a programmer need only input declarations pertaining to said shared objects once, regardless of the number of independent platforms an application will be released onto and which would each require a new set of said declarations pertaining to said shared objects according to the prior art.

We claim:

1. An apparatus comprising visual display means, processing means, storage means and memory means; wherein said memory means is configured to store program instructions for describing objects by means of object class description files, said objects to be shared over a network by a plurality of network-connected terminals, and for the compiling of said files by a data definition language compiler within an instructions set executable by said network-connected terminals, wherein object class definition files and object class description files, said objects to be shared over a network by a plurality of network-connected terminals, and for the compiling of said files by a data definition language compiler within an instructions set executable by said network-connected terminals, wherein each of said network-connected terminals is equipped with visual display means, processing means, storage means and memory means;

said memory means is configured to store said executable instructions set and said described objects; and said processing means is configured by said executable instructions set to manage the duplication of said described objects.

2. Apparatus according to claim 1, wherein said program instructions comprise a programming application including a linker, a Data Definition Language compiler, a Higher Level Programming Language compiler, a Data Definition Language library and one or a plurality of Higher Level Programming Language libraries.

3. Apparatus according to claim 1, wherein said objects are described using a hierarchy of Data Definition Language classes and Higher Level Programming Language classes.

4. Apparatus according to claim 3, wherein said Higher Level Programming Language classes inherit from said Data Definition Language classes.

5. Apparatus according to claim 1, wherein said Higher Level Programming Language classes and said Data Definition Language classes are declared by means of said ASCII instructions inputted in said programming application.

6. Apparatus according to claims 1, wherein said Data Definition Language classes include instructions for sharing said described objects by a plurality of network-connected terminals over a network.

7. Apparatus according to claim 1, wherein said network-connected terminals are known as platforms and described objects are simultaneously shared by a plurality of different platforms operating with different operating systems respectively.

8. Apparatus according to claim 1, wherein the first generation of said executable instructions set can be tested by said a plurality of network-connected terminals over said network.

9. Apparatus according to claim 1, wherein said described objects are known as duplicated objects.

10. Apparatus according to claims 1, wherein said executable instructions set instantiates one or a plurality of said duplicated objects in the local memory means of said a network-connected terminal and publishes said one or a plurality of said duplicated objects to remote memory means when executed by said network-connected terminal.

11. A method of sharing objects between a plurality of network-connected terminals, comprising the steps of
describing objects by means of object class definition files and object class description files, and
compiling said files within an instructions set executable by said network-connected terminals, wherein
each of said network-connected terminals is equipped with visual display means, processing means, storage means and memory means;
said memory means is configured to store said executable instructions set and said described objects; and
said processing means is configured by said executable instructions set to manage the duplication of said described objects.

12. Method according to claim 11, wherein said program instructions comprise a programming application including a linker, a Data Definition Language compiler, a Higher Level Programming Language compiler, a linker, a Data Definition Language library and one or a plurality of Higher Level Programming Language libraries.

13. Method according to claim 11, wherein said objects are described using a hierarchy of Data Definition Language classes and Higher Level Programming Language classes.

14. Method according to claim 13, wherein said Higher Level Programming Language classes inherit from said Data Definition Language classes.

15. Method according to claims 11, wherein said Higher Level Programming Language classes and said Data Definition Language classes are declared by means of said ASCII instructions inputted in said programming application.

16. Method according to claims 11, wherein said Data Definition Language classes include instructions for sharing said described objects by a plurality of network-connected terminals over a network.

17. Method according to claim 11, wherein said network-connected terminals are known as platforms and described objects are simultaneously shared by a plurality of different platforms operating with different operating systems respectively.

18. Method according to claim 11, wherein the first generation of said executable instructions set can be tested by said a plurality of network-connected terminals over said network.

19. Method according to claim 11 wherein said described objects are known as duplicated objects.

20. Method according to claims 11, wherein said executable instructions set instantiates one or a plurality of said duplicated objects in the local memory means of said a network-connected terminal and publishes said one or a plurality of said duplicated objects to remote memory means when executed by said network-connected terminal.

21. A computer-readable medium having computer-readable instructions executable by a computer such that, when executing said instructions, a computer will perform the steps of
describing objects to be shared by a plurality of network-connected terminals over a network by means of object class definition files and object class description files, and
compiling said files within an instructions set executable by said network-connected terminals, wherein
each of said network-connected terminals is equipped with visual display means, processing means, storage means and memory means;
said memory means is configured to store said executable instructions set and said described objects; and
said processing means is configured by said executable instructions set to manage the duplication of said described objects.

22. A computer-readable memory system having computer-readable data stored therein, comprising
one or a plurality of object class definition files;
one or a plurality of object class description files;
one or a plurality of user-defined files;
program instructions including a linker;
a Data Definition Language compiler;
a Higher Level Programming Language compiler;
a Data Definition Language library; and
one or a plurality of Higher Level Programming Language libraries;
wherein said program instructions are configured to describe objects to be shared by a plurality of network-connected terminals over a network by means of ASCII instructions; and
compile said ASCII instructions within an instructions set executable by said network-connected terminals.

* * * * *